J. H. VAN MELSEN.
EGG HOLDER AND OPENER.
APPLICATION FILED MAR. 18, 1920.
1,372,111.
Patented Mar. 22, 1921.
2 SHEETS—SHEET 1.
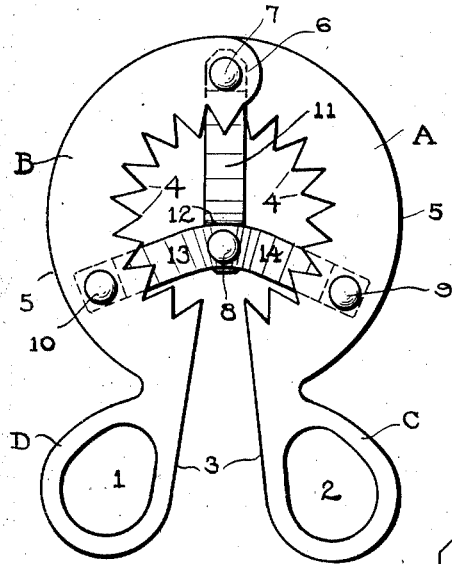
Fig 1.
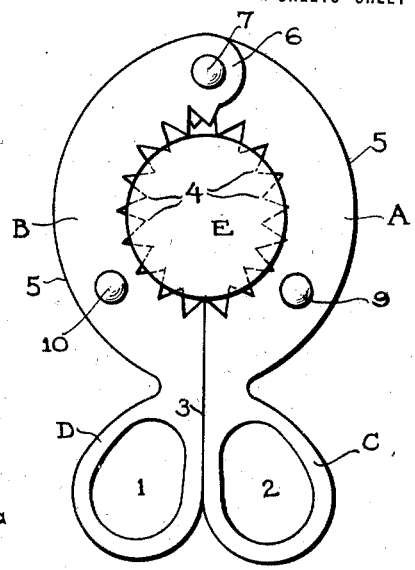
Fig. 3.
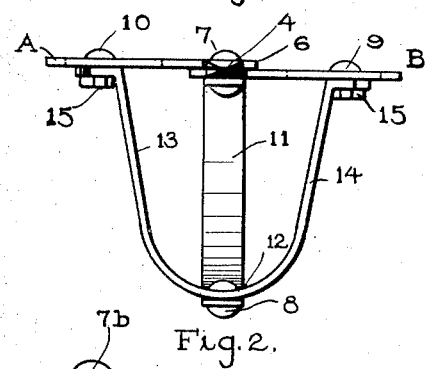
Fig. 2.
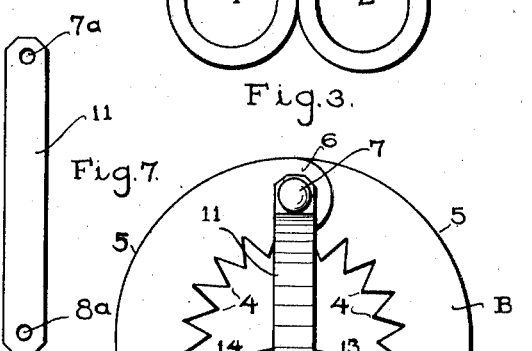
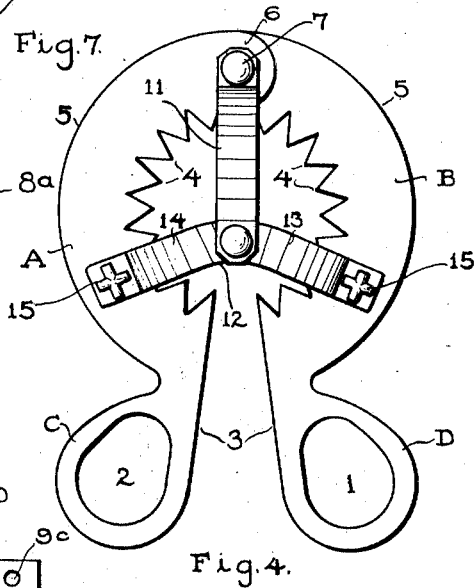
Fig. 4.
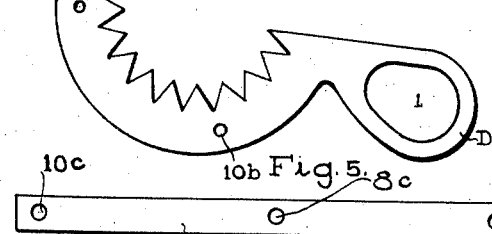
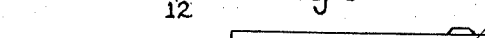
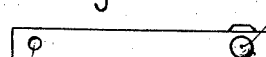
INVENTOR.
John H. Van Melsen.
BY William E. Baff ATTORNEY.

J. H. VAN MELSEN.
EGG HOLDER AND OPENER.
APPLICATION FILED MAR. 18, 1920.
1,372,111.
Patented Mar. 22, 1921.
2 SHEETS—SHEET 2.
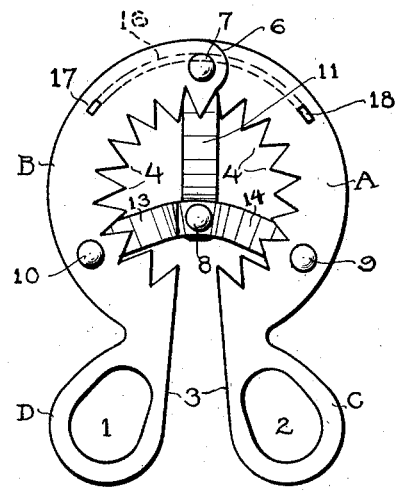
Fig. 9
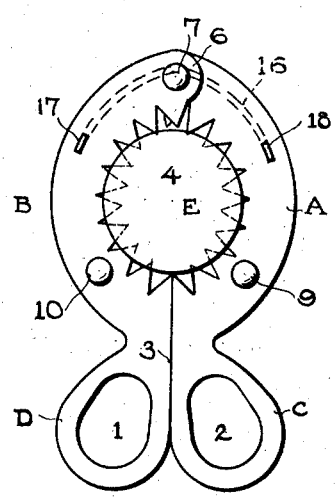
Fig. 11
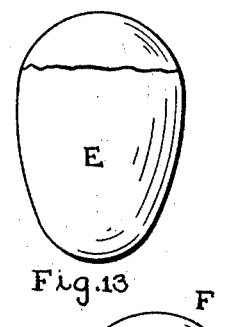
Fig. 13
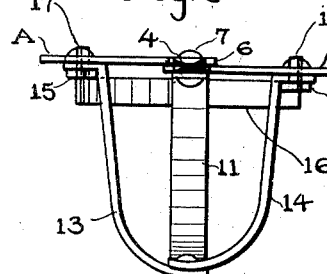
Fig. 10
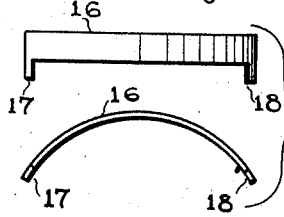
Fig. 12  Fig. 14.
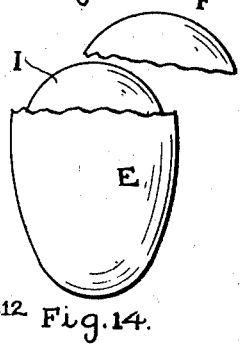
Fig. 15
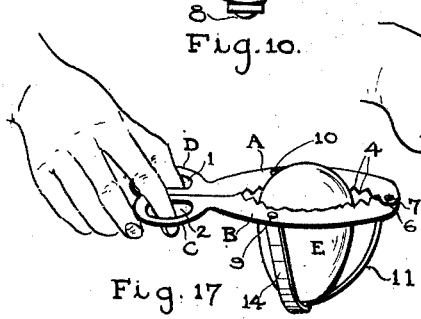
Fig. 17  Fig. 18
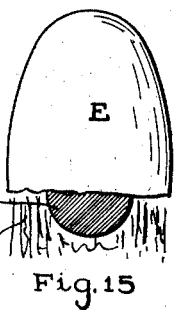
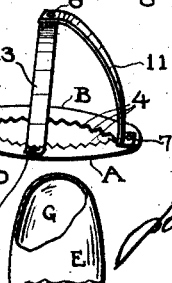
Fig. 19
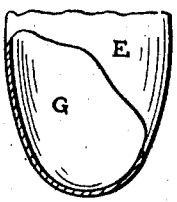
Fig. 16
INVENTOR.
John H. Van Melsen.
BY
William E. Baff ATTORNEY.

UNITED STATES PATENT OFFICE.

JOHN H. VAN MELSEN, OF WORCESTER, MASSACHUSETTS.

EGG HOLDER AND OPENER.

1,372,111.

Specification of Letters Patent. Patented Mar. 22, 1921.

Application filed March 18, 1920. Serial No. 366,977.

*To all whom it may concern:*

Be it known that I, JOHN H. VAN MELSEN, a citizen of the United States of America, and residing at the city of Worcester, in the county of Worcester and State of Massachusetts, have invented new and useful Improvements in Egg Holders and Openers, of which the following is a specification.

This invention relates to improvements in culinary utensils and more particularly to means whereby eggs may be conveniently supported while being opened.

Another object of my invention consists in providing a simple, efficient and inexpensive device of this character which will readily open eggs so as to permit the yolk as well as the white of a raw egg to be spilled into a pan, dish or other receptacle.

Another object of my invention is to provide a device which shall be economically constructed so as to be manufactured at an extremely low cost and thereby serve to initially break eggs to enable the contents thereof to be readily removed.

A still further object of my invention is to provide a holder for eggs wherein the desirable qualities of simplicity, ease of operation, durability and interchangeability to different sizes of eggs may be obtained.

With the above and other objects in view my invention consists in the arrangement, combination, and details of construction disclosed in the drawings and specification and then more particularly pointed out in the appended claims.

In the drawings, wherein similar reference characters designate similar parts throughout the respective views, Figure 1 is a top plan view of my invention.

Fig. 2 is a side elevation thereof,

Fig. 3 is a view of Fig. 1 showing the several parts closed around the egg,

Fig. 4 is a bottom plan view of the egg holder and opener,

Fig. 5 is a detail plan view of one of the jaws,

Fig. 6 is a plan view of a spring arm,

Fig. 7 is a view of another arm,

Fig. 8 is a plan view of still another arm,

Fig. 9 is a top plan view of a modified device,

Fig. 10 is a side elevation of Fig. 9,

Fig. 11 is a view of Fig. 9 showing the parts closed,

Fig. 12 are side and edge views of a spring arm,

Fig. 13 is a side view of an egg partially broken away,

Fig. 14 is a side view of an egg having its top portion broken away,

Fig. 15 is a view of an egg held with broken end down to enable contents thereof to be removed, Fig. 16 is a view of broken shell of an egg after operated upon by my invention, Fig. 17 is a perspective view of my invention with egg contained therein, Fig. 18 is a side view of egg holder and opener, and Fig. 19 is a perspective view of the device turned upside down so as to release an egg therefrom.

Referring to the drawings which are merely illustrative of my invention A designates one of the movable sections or jaws of my invention, the other an exact replica of which is designated B. The finger hold C of one jaw or section A has an opening 2, while that of D the other section B has its opening 1. Each section is formed with an arcuate series of teeth 4 formed upon its curved edge and terminates at one end in a lug 6 pivoted at 7 upon the similar lug formed upon its mate section, so that at the point 7 both sections are pivotally overlapped. 7$^b$ designates a pivot opening formed in each section and 3 designates a straight edge formed thereupon. A resilient arm or spring leaf or strip 12 is formed at its opposite ends with the openings 9$^c$, 10$^c$ and with the central opening 8$^c$, while the arm or strip 11 is formed at its opposite ends with the openings 7$^a$, 8$^a$, the opening 7$^a$ receiving the pivot pin 7 whereby this strip is properly positioned at this point, while another pivot pin 8 passes through the opening 8$^c$ of the resilient strip 12 and also through the opening 8$^a$ of the strip 11 and in this manner connects the arm 11 as a brace for the arm 12 and at the same time makes arm 11 serve to form the egg holder, this arm 11 being curved from the pivot points 7 and 8. The resilient arm 12 is also curved under tension from the pivot point or pin 8 to the rivets 9 and 10 which pass through openings 10$^b$ in the respective sections and also through the openings 9$^c$, and 10$^c$ of the resilient strip 12, thereby making a three armed wicket holder for eggs.

The resilient arm 12 is so constructed and shaped that when bent into curvilinear form and attached to the rivets 9 and 10 they, i. e., the ends of this strip will separate the handle portions C and D of the respective sections and of the complete device thereby enabling eggs of various sizes to be supported upon the three armed cage. The curved portions of arm 12 are designated 13, 14, the rivets 9, 10 having bent back fingers 15.

A modification of this invention is disclosed in Figs. 9–11 wherein the two sections of the cutter are shaped exactly the same as hereinbefore shown but in this construction there is used a separate spring member or arm 16 the opposite ends of which are provided with the lugs 17 and 18 adapted to be secured in the slits expressly provided therefor in the respective pivoted end portions of the egg holder and opener. It will be seen that in this construction the arm 12 is not made of spring material as the resiliency needed in this device is furnished by the pair of lugs 17 and 18 formed upon the curved spring arm 16, through the inherent springy action of this arm bowing when the sections are brought together.

In operation the user takes hold of the handle portions of the device as shown in Fig. 17, after an egg shall have been lodged into the three arm cage, and then brings the jaws or sections close together so that the teeth or points 4 of the two sections may dig into and penetrate the shell leaving a scored portion; while the egg is still clenched in the cage between both jaws the user or operator will remove the top portion of the shell designated F in Fig. 14; then while the two jaws are still closed about this egg E the device is turned upside down to permit the white and yolk L of the egg being removed therefrom inside $g$ of the shell E as shown in Fig. 15, after which the jaws which are still in engagement with the shell E of the egg will be opened and the bare shell dropped as shown in Fig. 19. This operation may be repeated and quickly made to remove the tops from eggs in a sanitary manner without the hands of the operator coming into contact with the egg thus held and supported. Numerous changes may be made in practice from this construction which are intended to be covered within the purview of the appended claims.

What I claim and desire to secure protection on is as follows:—

1. A device as described consisting of a pair of jaws, said jaws being pivotally connected together at one end, a curved arm also attached to the pivot of said jaws, another arm extending across so as to connect with both jaws and also with the first arm, and means whereby said jaws may yieldably be spread apart or be brought together.

2. A device as described consisting of two arms, one longer than the other, the longer arm being bowed to provide side arms, and the shorter arm also being curved and attached at one end to the central point of the longer arm, a pair of cutting jaws pivoted together upon the other end of the shorter arm, said cutting jaws adapted to strain and flex said longer arm as they are brought toward each other.

In witness whereof I have hereunto set my hand and affixed my seal this fifteenth day of March, 1920.

JOHN H. VAN MELSEN. [L. S.]

Attest:
WILLIAM E. BAFF,
SILAS H. LORD.